(12) United States Patent
Dunston-Kelly

(10) Patent No.: US 12,547,015 B1
(45) Date of Patent: Feb. 10, 2026

(54) MOBILE DEVICE USING PARALLAX BARRIER AUTOSTEREOSCOPIC METHOD TO DISPLAY 3D IMAGE

(71) Applicant: Linda Dunston-Kelly, Long Beach, CA (US)

(72) Inventor: Linda Dunston-Kelly, Long Beach, CA (US)

(73) Assignee: Danny Wayne Pryor, Long Beach, CA (US)

( * ) Notice: Subject to any disclaimer, the term of this patent is extended or adjusted under 35 U.S.C. 154(b) by 1008 days.

(21) Appl. No.: 16/507,193

(22) Filed: Jul. 10, 2019

(51) Int. Cl.
*G02B 30/30* (2020.01)
*G02B 5/30* (2006.01)
*H04N 13/31* (2018.01)

(52) U.S. Cl.
CPC ........... *G02B 30/30* (2020.01); *G02B 5/3033* (2013.01); *H04N 13/31* (2018.05)

(58) Field of Classification Search
CPC ................................................ G02B 30/30–32
See application file for complete search history.

(56) References Cited

U.S. PATENT DOCUMENTS

2008/0231952 A1* 9/2008 Kim ...................... G02B 30/32
359/465

FOREIGN PATENT DOCUMENTS

KR 20180113062 A * 10/2018

* cited by examiner

*Primary Examiner* — Mariceli Santiago

(57) ABSTRACT

The invention relates to a mobile device using parallax barrier autostereoscopic method to display a 3D image. The mobile device using parallax barrier autostereoscopic method to display a 3D image, comprising: a LCD panel connected to the mobile device, the LCD panel is multilayered and from top to bottom contains a cover lens layer, a CF-glass layer, a TFT-glass layer, a transparent reflective layer, a reflective polarizer layer and a backlight layer; wherein the transparent reflective layer acts the function of parallax barrier, and because the transparent reflective layer can let some portion of light penetrate it, the brightness loss is low. The combination of the above features along with the mobile device, allows viewers to view 3D images with their naked eye.

10 Claims, 3 Drawing Sheets

LENS STRUCTURE

MOBILE DEVICE USING PARALLAX BARRIER AUTOSTEREOSCOPIC METHOD TO DISPLAY 3D IMAGE

FIELD OF THE INVENTION

The present invention generally relates to a mobile device using parallax barrier autostereoscopic method to display a 3D image, and especially to a mobile device can display a 3D image with high definition and low brightness loss.

BACKGROUND OF THE INVENTION 3D technology is gradually popular at present, and the 3D technology can make picture become three-dimensional true to nature, and image no longer is confined on the plane of screen, as if it can walk out the screen, gives the audience a fully immersive experience. The basic principle of 3D technology is using the fact that people can receive different images on the left eye and right eye respectively, and then the brain will regenerate an image with stereoscopic effects by superimposing the image information that the left eye and right eye respectively received. However, most of the present mobile devices, like cellphone, display images or videos in 2D, and that is not captivating and vivid enough, if the mobile devices can demonstrate 3D effect on the screen, it will greatly improve the entertainment of mobile devices.

Presently, there are many solutions for making mobile devices that can demonstrate 3D effect. Some of these solutions attempt to change and update, but these solutions fail to meet the needs of the industry because correct problems in the display structure. Other solutions attempt to change the display structure it has to be tested and matched with your chip set, but these solutions are similarly unable to meet the needs of the industry because they have not been tested fully. Still other solutions seek to make corrections, but these solutions also fail to meet industry needs because it will be needed to go through a lot of complex testing.

Furthermore, it would also be desirable to have a mobile device that can demonstrate 3D effect and also having high definition. Therefore, there currently exists a need in the industry for a display structure having parallax barrier, reflecting on a design to a ten-layered lens that can fine-tune the graphic.

SUMMARY OF THE INVENTION

The purpose of the present invention is to provide a mobile device using parallax barrier autostereoscopic method to display a 3D image, which solves the problem of low definition and high brightness loss, and don't need to go through a lot of testing.

The present invention adopts the following technical solutions:

A mobile device using parallax barrier autostereoscopic method to display a 3D image, comprising:
  a LCD panel connected to the mobile device, the LCD panel is multilayered and from top to bottom contains a cover lens layer, a CF-glass layer, a TFT-glass layer, a transparent reflective layer, a reflective polarizer layer and a backlight layer;
  wherein the transparent reflective layer acts the function of parallax barrier, and because the transparent reflective layer can let some portion of light penetrate it, the brightness loss is low.

In some embodiments, the transparent reflective layer is using "reverse slit projection technique—micro control" to act the function of parallax barrier.

In some embodiments, the reflective polarizer layer is advanced polarization conversion film.

In some embodiments, the LCD panel is sealed together using cold press.

In another aspect, the LCD panel is a ten-layer structure and from top to bottom consisting of the cover lens layer, a first adhesive layer, a top polarizer film layer, the CF-glass layer, the TFT-glass layer, a bottom polarizer film layer, a second adhesive layer, the transparent reflective layer, the reflective polarizer layer and the backlight layer.

In some embodiments, the thickness of the transparent reflective layer is 0.15 mm.

In some embodiments, the thickness of the second adhesive layer is 0.15 mm.

Through the above multi-layer structure or detailed ten-layer structure, the mobile device can have high resolution and low brightness loss, and because the structure is clear and does not have a complicated composition, it does not need to go through a lot of complicated testing.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE INVENTION

Figure 1:
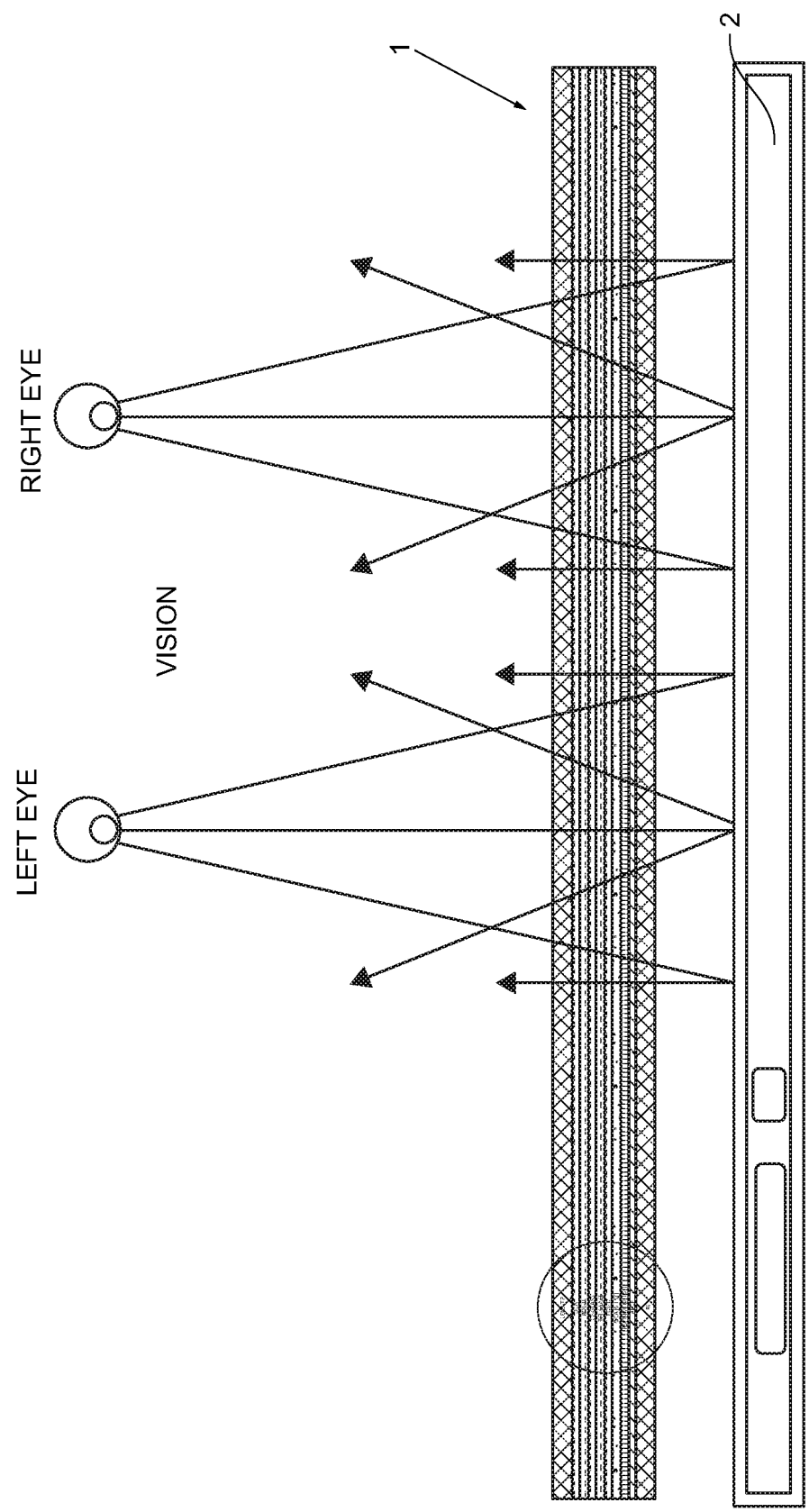
FIG. 1 illustrates a schematic view of the cross section of the LCD panel that will be assembled to the mobile device.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 1A:
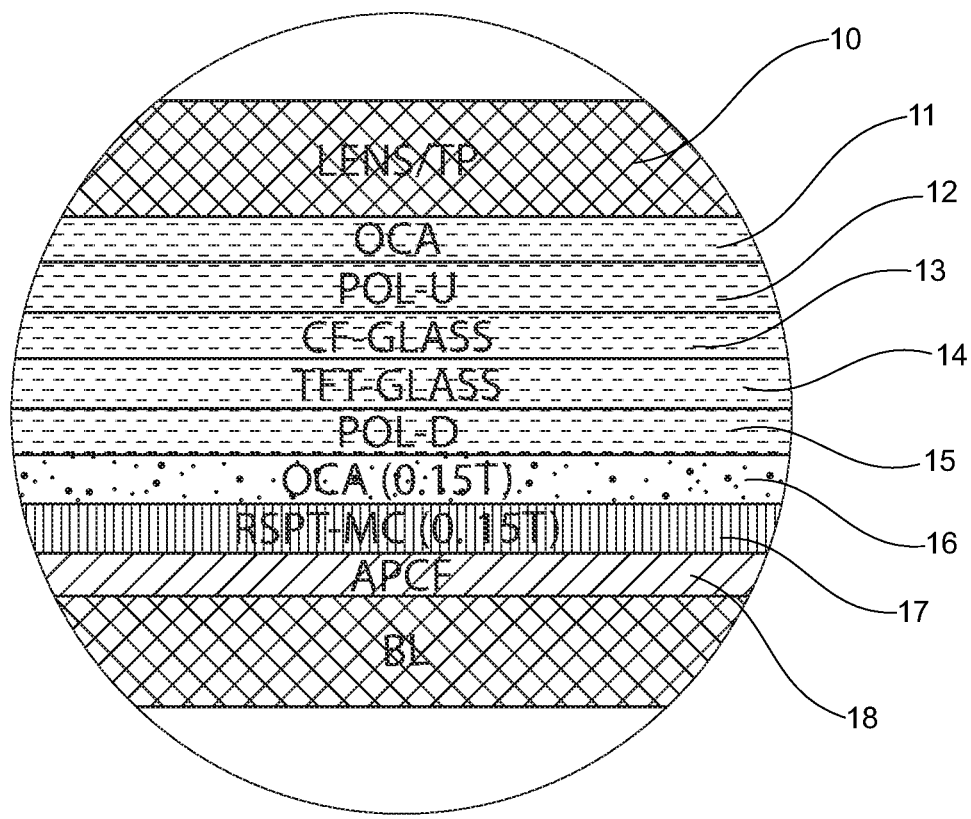
FIG. 1A illustrates a partial enlargement of the LCD panel in FIG. 1.
Figure 2:
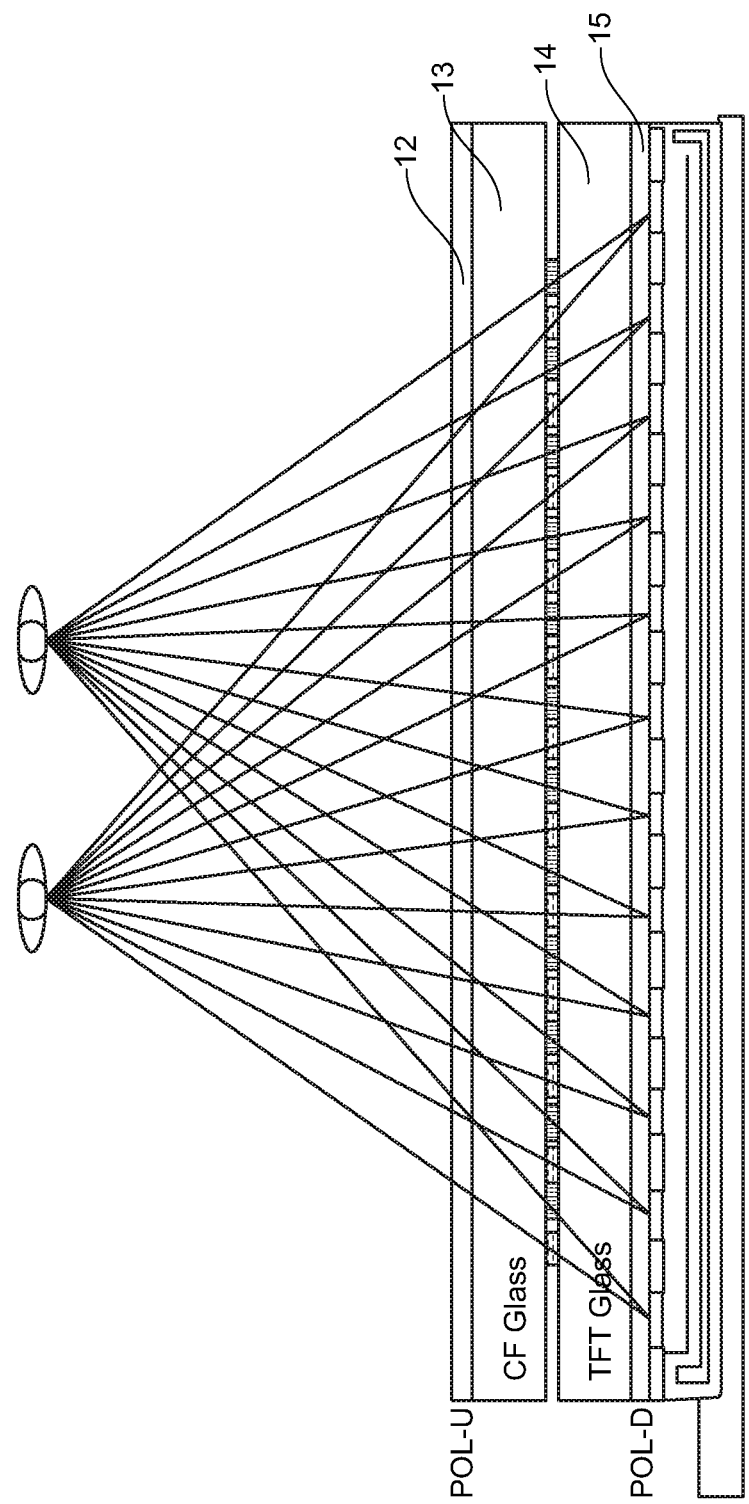
FIG. 2 illustrates a schematic view of mobile device using Reverse slit projection technique-micro control.

In one embodiment of the present invention presented in FIGS. 1, 1A and 2, a mobile device using parallax barrier autostereoscopic method to display a 3D image, comprising:

A LCD panel1 connected to the mobile device2, the LCD panel1 is multilayered and from top to bottom contains a cover lens layer10, a CF-glass layer13, a TFT-glass layer14, a transparent reflective layer17, a reflective polarizer layer18 and a backlight layer19;

wherein the transparent reflective layer17 acts the function of parallax barrier, and because the transparent reflective layer17 can let some portion of light penetrate it, the brightness loss is low.

In a second aspect, the LCD panel1 is a ten-layer structure and from top to bottom consisting of the cover lens layer10, a first adhesive layer11, a top polarizer film layer12, the CF-glass layer13, the TFT-glass layer14, a bottom polarizer film layer15, a second adhesive layer16, the transparent reflective layer17, the reflective polarizer layer18 and the backlight layer19. This ten-layer structure combines lens and LCD screen together with tuning to the parallax codes, and provide full high definition of 3D image to the viewer that does not suffer from any of the problems or deficiencies associated with prior art.

In another aspect, the transparent reflective layer17 is using "reverse slit projection technique—micro control" to act the function of parallax barrier, and the reflective polarizer layer18 is advanced polarization conversion film. This is unique when compared with other known systems and solutions in that provides 3D video content on communication device.

In another aspect, the thickness of the transparent reflective layer17 and the second adhesive layer16 is 0.15 mm.

In another aspect, the LCD panel1 is sealed together using cold press. This process has several advantages like: can save time and cost, structure will have high precision and high surface quality. Also, the LCD panel1 using cold press can avoid the problem like the continuity of batch production is poor, and it is not easy to maintain stability during the process while using hot press.

In another aspect, this invention further comprising a glass mask, a BM-TWO mask, and a M-mask which allow vision clarity with lens combination of the LCD panel1.

One objective of the present invention is to create an architecture for the mobile device that has combined multi-layered lenses and LCD screen to let viewers can enjoy naked eye 3D image from all angles and either eye.

There are one or more components within the mobile device2: Two dimensional effects, which would operate the same. Additionally, the associated computerized process may also have one or more of the following optional executable steps: Is to have the lens reflex two-dimensional process results.

The 3D system used in the mobile device2 is unique when compared with other known systems and solutions in that provides 3D video content on communication device. Similarly, the software disclosed is unique when compared with other known solutions in that it provides adjusted imagery through design lenses.

The LCD panel1 is unique in that the overall architecture is different from other known 3D systems. More specifically, it provides: (1) sleek outer design; (2) 0.1-centimeter thin for the LCD panel1; and (3) Omni-viewable screen. Similarly, the LCD panel1 can incorporate all different systems, CPU, OS, 3D, GPS, Wi-Fi, etc.

In another embodiment, A thin-film-transistor liquid crystal display that use thin film transistor technology to improve image qualities, addressability and contrast. A special kind of film of active semiconductor layer and dielectric layer and metallic contact. Which each pixel is controlled by from one of the four transistors. The TFT provides the best resolution of all the flat panel technique. Viewing through the CF layer13 of glass on top of the TFT layer14 gives the viewer the Slit Projection Technique-micro control to view 3D image. When this technique is reverse (previous embodiment), viewing reverse back at the viewer, enhancing the image in reverse.

Because of the principles of optics, the projection technique is in effect. By using the different position grating on glass to distinguish the graphic from left to right eyes. The term 3D Naked Eyes is the structure of optical grating which penetrate or obstruct light go into our eyes to distinguish the graphic from left to right eye. With the right video player viewing, is clear Naked eye 3D. Our figures show polarization grating on glass, which means principals for glasses (lens layers) from lights through ten lenses to have the 3D effect.

The embodiments of this invention have many different features, and multiple variations. It has been described in the application at times in terms of specific embodiments for illustrative purposes. Without the intent to limit or suggest that the invention conceived is only one embodiment. It is to be understood that the invention is not limited to any single specific embodiments or enumerated variations. Many modifications, variations and other embodiments of the invention will come to mind of those skilled in the art to which this invention pertains, and which are intended to be and are covered by both this disclosure. It is indeed intended that scope of the invention should be determined by proper interpretation, construction of the disclosure, and including equivalents, as understood by those of skill in the art relying upon the complete disclosure at the time of filing.

In some embodiments, the GPU of the mobile device is ARM Mali G72 MP3 700 MHz and it can support all modern graphics APIs like OpenGL ES 3.2, Vulkan 1.0, OpenCL 2.0, DirectX 12 FL11_1 and Renderscript.

Those skilled in the art will recognize that the type of the mobile device2 is the smartphone in the above embodiments, but other types of the mobile device2 such as tablet can can also be used as an example, which is not limited.

The combination of the above features along with the mobile device2, allows viewers to view 3D images with their Naked Eye. The unique optics of this invention will revolutionize how imagery can be process and displayed in real time. Prior to this technology, most image would be distorted and each frame per second would be detectable. This is an industry break through.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A mobile device using parallax barrier autostereoscopic method to display a three-dimensional (3D) image, the method comprising:
an LCD panel connected to the mobile device, wherein the LCD panel comprises a plurality of layers from top to bottom, the plurality of layers including a cover lens layer, a CF-glass layer, a TFT-glass layer, a transparent reflective layer, a reflective polarizer layer and a backlight layer,
wherein the transparent reflective layer is configured to facilitate a parallax barrier technique based on a positioning of the CF-glass layer on top of the TFT-glass layer,
wherein the plurality of layers in the LCD panel is associated with a multi-layered structure of at least ten layers, and
wherein the multi-layered LCD panel is configured with tuning to a plurality of parallax codes thereby combining the cover lens layer and the LCD panel, to display the 3D image.

2. The method as recited in claim 1, wherein the transparent reflective layer is using "reverse slit projection-technique-micro control" to act the function of parallax barrier.

3. The method, as recited in claim 1, wherein the reflective polarizer layer is advanced polarization conversion film.

4. The method as recited in claim 1, wherein the LCD panel is sealed together using cold press.

5. The method as recited in claim 1, wherein the multi-layered LCD that includes the at least ten layers comprises from top to bottom the cover lens layer, a first adhesive layer, a top polarizer film layer, the CF-glass layer, the TFT-glass layer, a bottom polarizer film layer, a second adhesive layer, the transparent reflective layer, the reflective polarizer layer and the backlight layer.

6. The method, as recited in claim 5, wherein the transparent reflective layer is using "reverse slit projection-technique—micro control" to act the function of parallax barrier.

7. The method, as recited in claim 6, wherein the reflective polarizer layer is advanced polarization conversion film.

8. The method, as recited in claim 7, wherein the thickness of the transparent reflective layer is 0.15 mm.

9. The method, as recited in claim 7, wherein the thickness of the second adhesive layer is 0.15 mm.

10. The method image, as recited in claim 9, wherein the LCD panel is sealed together using cold press.

* * * * *